ized patents of Phosphorus Oxychloride and Their Use for Separating Niobium and Tantalum from Mixtures Containing Them

United States Patent Office
2,936,214
Patented May 10, 1960

2,936,214

PROCESS FOR THE PRODUCTION OF ADDITION PRODUCTS OF PHOSPHORUS OXYCHLORIDE AND THEIR USE FOR SEPARATING NIOBIUM AND TANTALUM FROM MIXTURES CONTAINING THEM

Walter Scheller, Neuewelt, and Helmut Abegg, Allschwil, Switzerland, assignors to Ciba Limited, Basel, Switzerland No Drawing. Application March 7, 1957
Serial No. 644,451

Claims priority, application Switzerland March 22, 1956

8 Claims. (Cl. 23—17)

This invention provides a process for the production of new addition products of phosphorus oxychloride, and a process for their use in separating niobium and tantalum from mixtures which contain these two chemically related metals that are difficult to separate from one another and usually occur together in nature and which mixtures may contain these two metals in association with other accompanying elements.

Apart from the old method of Marignac which depends on fractional crystallisation of the alkali double fluorides (whereby the sparingly soluble $K_2TaF_7$ can be separated from a solution containing $K_2NbOF_5$), and has the main disadvantage that it necessitates the use of hydrofluoric acid, there are various other processes known for separating niobium and tantalum from one another which recommend a more or less selective chlorination of materials containing niobium and tantalum, if desired, after preliminary reduction or nitride formation, and which all necessitate the use of very high temperatures, and sometimes even two high temperature treatments.

The present invention is based on the observation that the chlorides of niobium and tantalum form addition products with phosphorus oxychloride ($POCl_3$) which are distinguished by very valuable properties. These addition products are obtained by reacting the chlorides of niobium and tantalum, if desired, in admixture with other halides of elements which occur in nature or industry with niobium and tantalum, with phosphorus oxychloride under anhydrous conditions.

The reaction of niobium pentachloride and/or tantalum pentachloride with phosphorus oxychloride may be carried out, for example, by dissolving the solid pentachloride or pentachlorides in liquid phosphorus oxychloride at the ordinary or a raised temperature, and removing the excess of phosphorus oxychloride, for example, by evaporation. Alternatively, phosphorus oxychloride vapour may be brought into contact with the solid pentachloride or pentachlorides, or phosphorus oxychloride vapour may be reacted with the pentachloride or pentachlorides in the form of vapour.

The addition products of phosphorus oxychloride with niobium pentachloride or tantalum pentachloride so obtained are new. They are solid compounds at ordinary temperature, and melt at lower temperatures than the pentachlorides themselves. Their constitution has not been fully ascertained. However, it has been found by analysis that, among other products, addition products of the metal pentachlorides with phosphorus oxychloride in the ratio 1:1 are formed. These new phosphorus oxychloride addition products of niobium pentachloride or tantalum pentachloride are valuable compounds which can be used, for example, for separating these elements from one another.

Thus, it has been found that the new addition compounds of phosphorus oxychloride with niobium pentachloride and with tantalum pentachloride can be distilled, and that niobium and tantalum can be separated with advantage from mixtures of halides or chlorination mixtures which contain niobium and tantalum in the form of their chlorides and may also contain halides of other accompanying substances, by treating such a mixture with phosphorus oxychloride under anhydrous conditions, and separating the addition products formed by fractional distillation.

As mixtures of halides to be used in the process of this invention there may be mentioned, more especially, chlorination mixtures which contain niobium and tantalum in the form of their pentachlorides. Such chlorination mixtures can be obtained by methods in themselves known, for example, by the chlorination of materials which contain niobium and tantalum in oxidised form, for example, slags and especially concentrates and ores, which may have been after-treated for the purpose of enrichment, or mixtures or oxides of these two metals, with chlorine gas and reducing agent, such as carbon. Thus, for example, a mixture containing the oxides of niobium and tantalum such as is available in industry or a natural product containing these two elements mostly in the form of their oxides, may be formed into briquettes with carbon, and the briquettes treated with chlorine gas at 400–1000° C. in a shaft furnace or rotary furnace. The chlorination products so obtained, which may contain substantial amounts of niobium oxychloride, may be further chlorinated with chlorine gas in the presence of carbon, in order to convert the oxychloride completely into the pentachloride. The greater part of the chlorides, also formed during the chlorination, of other elements which may be present in the starting material in addition to niobium and tantalum, and compounds of which are usually present as impurities, such, for example, as the chlorides of titanium, tin, manganese, etc., may be at least partially removed in a simple manner, for example, by so adjusting the temperature in the chlorination chamber and in the condensation chamber that the chlorides of the accompanying elements, whose boiling or volatilisation points generally differ widely from those of the chlorides of niobium and tantalum, are separated to a great extent from the latter chlorides. Thus, for example, the sparingly volatile chloride of manganese may be separated first, and the more readily volatile chlorides, for example, those of silicon, tin and titanium, are condensed only after the condensation of the chlorination mixture containing niobium and tantalum to be subjected to separation by the present process, for example, by being precipitated in condensing chambers of lower temperature.

Mixtures of tantalum pentachloride and niobium pentachloride to be used as starting materials in the present process can also be obtained by treating the niobium and tantalum oxides with phosphorus pentachloride at a raised temperature, for example, about 200° C. with the exclusion of air and moisture, or by heating the oxides in a current of dry carbon tetrachloride, or by chlorinating alloys of niobium and tantalum, such as ferro-columbium etc.

The treatment of the chlorination mixtures so obtained with phosphorus oxychloride may be carried out at a raised temperature, but advantageously at a temperature at which phosphorus oxychloride is in the liquid state, for example, under atmospheric pressure, at room temperature and with the exclusion of moisture. The proportion of the phosphorus oxychloride used is such that at least one molecular proportion of phosphorus oxychloride is used for each molecular proportion of the chlorides present in the chlorination mixture. Advantageously the crude chlorination mixture is dissolved in phosphorus oxychloride, whereupon the addition products of phosphorus oxychloride with chlorides of zirconium or titanium which may be present as impurities in the chlorination mixture, and which are sparingly soluble to insoluble in the solvent, separate out in crystalline form, if they are present in sufficient amount, and can easily be removed, for example, by filtration. After separating the phosphorus oxychloride addition products insoluble in phosphorus oxychloride, the excesses of phosphorus oxychloride may be removed by distillation, for example, at 100° C.–200° C. under atmospheric pressure, whereas the phosphorus oxychloride addition products of the metal halide starting materials, especially the phosphorus oxychloride addition products of niobium pentachloride and of tantalum pentachloride, remain behind as a liquid or solid residue.

Mixtures of the phosphorus oxychloride addition products of niobium and tantalum pentachloride to be subjected to the separation treatment can also be obtained by reacting a mixture of the solid pentachlorides with phosphorus oxychloride vapour, advantageously while the pentachlorides are heated above the melting points of the phosphorus oxychloride addition products to be formed, that is to say, at 100–180° C., whereby the reaction products are obtained directly in liquid form and no subsequent removal of excess phosphorus oxychloride is necessary. The mixture to be subjected to the separation treatment may also be obtained by reacting the chlorides in the form of vapour with phosphorus oxychloride vapour, for example, by bringing the metal chloride vapours leaving the chlorination zone into contact with phosphorus oxychloride vapour or with an inert gas containing phosphorus oxychloride vapour, whereby the addition compounds to be separated from one another are obtained directly in the form of a liquid or solid mixture by cooling. This last mentioned method of producing the mixture of addition products is especially advantageous, because the difficulties that otherwise often attend the condensation of pentachlorides can easily be avoided in that the layers of addition products, which adhere to the walls of the condenser, and contract strongly on cooling, become brittle and slide away from the walls.

The fractional distillation of the mixture of phosphorus oxychloride addition products so obtained can be carried out by methods in themselves known, for example, under atmospheric pressure, with the exclusion of moisture and in an inert atmosphere, for example, dry air or in an atmosphere of dry nitrogen or dry carbon dioxide. It can also be carried out under reduced pressure whereby the distillation temperature can be kept relatively low. The fractional distillation can also be carried out, for example, by heating the mixture of the metal chloride-phosphorus oxychloride addition products, which is at first solid and then remelts as the temperature rises, to the volatilisation temperature in a stream of carbon dioxide or nitrogen or under a reduced pressure of the order of about 15 mm. to about 1 mm. of mercury, and advantageously about 10 mm. of mercury, then condensing and separating the addition products which volatilise first, thereby splitting up the mixture at different temperatures into several fractions. It is easily possible in this manner to isolate, for example, from a mixture of niobium and tantalum pentachloride addition products a fraction distilling at about 143° C. under 10 mm. pressure of mercury, which fraction consists preponderantly or wholly of the niobium pentachloride-phosphorus oxychloride addition product. The fraction which distils at about 163° C. under 10 mm. pressure of mercury contains the corresponding tantalum pentachloride addition product, whereas the higher boiling addition product of zirconium chloride and the undesired chlorides not removed prior to the reaction with phosphorus oxychloride, such as aluminum chloride and iron chloride, may be left behind in the distillation vessel as distillation residue. It is of advantage to add to the mixture of addition products before distillation inert substances which boil at a temperature higher than that of the tantalum pentachloride-phosphorus oxychloride addition product. Thus, it is possible, for example, by the addition of the aluminum chloride-phosphorus oxychloride addition product, to ensure that the products in the distillation residue, especially the iron chloride addition product, which forms solid incrustations, are in a form relatively easy to work up, that is to say, are present in solution or in a finely suspended form in the liquid aluminum chloride addition product. Instead of adding aluminium chloride-phosphorus oxychloride addition product to the mixture of addition products, it will be understood that aluminum chloride may be added to the chlorination mixture used as starting material before the latter is reacted with phosphorus oxychloride, so that the aluminum chloride addition product is formed at the same time as the mixture of addition products to be subjected to the separation treatment is formed.

The addition compounds of phosphorus oxychloride and niobium pentachloride or tantalum pentachloride may be redistilled for the purpose of further purification. However, even after the first distillation in the process of the invention a relatively good separation of the two elements niobium and tantalum is usually achieved. This is especially the case when the accompanying elements have been removed, if desired, by a preliminary fractional distillation of the mixture of addition products, for example, under atmospheric pressure. In order to obtain enriched or pure niobium and tantalum pentachloride from the addition products thereof with phosphorus oxychloride, the addition products may be decomposed into their components by treatment with inert solvents. The decomposition may be carried out, for example, at a slightly raised temperature, but advantageously at room temperature by the simple addition of the addition product to the solvent. As solvents there may be used inert solvents, that is to say liquids which are capable of dissolving or forming addition products with phosphorus oxychloride without decomposing, for example, solvents of organic or inorganic nature, for example, liquid hydrocarbons and above all halogenated compounds, such as carbon tetrachloride, chloroform, chlorobenzene, and also solvents which form with the niobium and tantalum pentachlorides regenerated from the phosphorus oxychloride addition products new addition products which are generally hardly soluble in the solvent and are unstable at raised temperatures, for example, ethers, esters and ketones, for example, ethyl ether, ethyl acetate, acetone, etc. There are advantageously used solvents in which phosphorus oxychloride is soluble but in which the metal pentachlorides or the newly formed metal pentachloride addition products with the solvent are insoluble, so that the separation of the insoluble solid products can be carried out, for example, by simple filtration.

After the decomposition of the chloride-phosphorus oxychloride addition products and removal of the insoluble pentachlorides or their newly formed addition products, the phosphorus oxychloride can be freed from solvent by methods in themselves known, for example, by distillation. The regenerated phosphorus oxychloride can be used in further reactions with chloride mixtures containing niobium and tantalum. Similarly, the solvent recovered during the regeneration of the phosphorus oxychloride can be re-used directly in the process. Thus, niobium and tantalum may be separated from one another in a cyclic process, in which it is necessary to make good only the quantities of niobium and tantalum chlorides consumed and, when necessary, the efficiency of phosphorus oxychloride and solvent which may be lost in the process.

Thus, in the process of this invention chloride mixtures containing niobium and tantalum which are difficult to separate can easily be split up by reaction with phosphorus oxychloride and fractional distillation of the resulting addition compounds, into fractions of which one contains principally tantalum and the other niobium, and from which the initial pentachlorides of niobium and tantalum can, if desired, be recovered in a simple manner.

The following examples illustrate the invention, the parts and percentages being by weight unless otherwise stated, and the relationship by parts by weight to parts by volume being the same as that of the kilogram to the litre:

*Example 1*

A mixture of 10 parts of niobium pentachloride and 10 parts of tantalum pentachloride (which quantities correspond to 44.3% of $Nb_2O_5$ and 55.7% of $Ta_2O_5$) is dissolved at room temperature in 30 parts by volume of freshly distilled phosphorus oxychloride, and the solution so obtained in freed from undissolved solid compounds by filtration. The excess of phosphorus oxychloride is removed from the clear solution by heating it at 40° C. under 30 mm. pressure of mercury. The residue which remains behind and melts at 100–110° C., is then split up by fractional distillation under 13 mm. pressure of mercury into a first fraction which distills at 158–163° C. and a second fraction which distils at 163–169° C. By analysis the first fraction contains 87.5 percent of niobium (calculated as $Nb_2O_5$) and 12.5 percent of tantalum (calculated as $Ta_2O_5$), and the second fraction has the following composition:

|  | Percent |
|---|---|
| $Nb_2O_5$ | 26.0 |
| $Ta_2O_5$ | 74.0 |

*Example 2*

5 parts of aluminum chloride and 19.6 parts of a mixture of solid chlorides obtained by the chlorination of briquettes of columbite ore and carbon with chlorine gas at 600° C., and which mixture contains niobium pentachloride and tantalum pentachloride and other metal chlorides, are dissolved in 30 parts by volume of freshly distilled phosphorus oxychloride at ordinary temperature. After evaporating the excess of phosphorus pentachloride by heating the solution in a current of dry carbon dioxide at 110–150° C. under atmospheric pressure, the residue of phosphorus oxychloride-metal chloride addition products is likewise distilled in a current of carbon dioxide under atmospheric pressure. 21.3 parts of a fraction distilling between 238 and 272° C. are collected and analysed.

Analysis:

|  | Initial mixture of solid chlorides, percent | Distillate, percent |
|---|---|---|
| Niobium | 39.2 | 73.2 |
| Tantalum | 38.2 | 26.3 |
| Iron | 12.0 | <0.17 |
| Aluminum | 1.5 | <0.3 |
| Titanium | <0.15 | none |
| Zirconium | 0.42 | none |
| Tungsten | 4.2 | trace |
| Manganese | <1.4 | trace |
| Boron | <1.4 | none |
| Silicon | 0.27 | <0.1 |
| Magnesium | <1.4 | none |

The analysis shows that in this manner the niobium pentachloride and tantalum pentachloride addition products are separated to a considerable extent from the addition products of the accompanying elements.

*Example 3*

By the chlorination of columbite in the presence of carbon and subsequent chlorination of the niobium oxychloride to the pentachloride a mixture of solid chlorides having the following composition (calculated as oxides) is obtained:

|  | Percent |
|---|---|
| $Nb_2O_5$ | 52.9 |
| $Ta_2O_5$ | 32.0 |
| $Al_2O_3$ | 0.5 |
| $Fe_2O_3$ | 12.2 |
| $ZrO_2$ | 0.8 |
| $TiO_2$ | Trace |
| $SiO_2$ | 0.1 |
| MnO | 0.3 |
| $WO_3$ | 1.0 |
| Bi, Pb | Trace |

1410 grams of this chloride mixture are allowed to react with 1580 grams of phosphorus oxychloride for 12 hours. The mixture is then slowly heated in an oil bath, whereby there is obtained at about 70° C. a homogeneous dark red solution. The reflux condenser above the flask is maintained at about 210° C. by means of boiling triethylphosphate. At the outlet of the condenser are connected a water condenser and a receiver to collect the excess of phosphorus oxychloride. The access of air to the apparatus is prevented by a stream of carbon dioxide.

The excess of phosphorus oxychloride which boils at 106° C. is recovered in the receiver and used for the production of further addition products. The heating of the mixture of addition products is continued (towards the end in an air bath) until an intense reflux of addition products condensed at 210° C. occurs.

There are recovered about 940 grams of yellowish orange phosphorus oxychloride, and about 2.05 kilograms of the mixture of addition products is obtained.

After the addition of 250 grams of $AlCl_3.POCl_3$ the mixture of addition products is subjected to fractional distillation under the following conditions:

Height of column _____ 26 mm.
Diameter of column ___ 4 mm. Berl saddles.
Filling bodies _____ 100 mm. Hg (carbon dioxide).
Pressure _____ 150 mm. Hg.
Dynamic pressure _____ 1600 mm. (Pyrex glass).

The following fractions are collected:

(1) Preliminary fraction
  (about 40 grams) _____ Boiling at 198 to 198.5° C.
(2) Niobium fraction
  (about 820 grams) _____ Boiling point 198.5 to 198.6° C.
(3) Intermediate fraction (about 50 grams) ____ Boiling point 198.6–220.7° C.
(4) Tantalum fraction
  (about 250 grams) _____ Boiling point 220.7–220.8° C.

The fractions are worked up into phosphorus-free oxides and the latter are examined spectrographically.

The following analyses illustrate the degree of separation attainable under these conditions:

|  | Fraction (2), percent | Fraction (4), percent |
|---|---|---|
| $Nb_2O_5$ | 99.15 | 0.48 |
| $Ta_2O_5$ | 0.36 | 99.00 |
| $SiO_2$ | 0.30 | 0.45 |
| $Al_2O_3$ |  |  |
| $TiO_2$ | trace | trace |
| $ZrO_2$ |  |  |
| $Fe_2O_3$ | 0.17 | 0.09 |

What is claimed is:
1. A process for separating niobium and tantalum values from one another which comprises fractionally distilling in an inert atmosphere and under anhydrous conditions a mixture of the 1:1 addition product of phos- phorus oxychloride with niobium pentachloride and the 1:1 addition product of phosphorus oxychloride with tantalum pentachloride and separately recovering the niobium and tantalum values.

2. A process according to claim 1 wherein the mixture was obtained by chlorinating an ore containing niobium and tantalum.

3. A process for separating niobium and tantalum values from one another which comprises fractionally distilling under anhydrous conditions and reduced pressure a mixture of the 1:1 addition product of phosphorus oxychloride with niobium pentachloride and the 1:1 addition product of phosphorus oxychloride with tantalum pentachloride and separately recovering the niobium and tantalum values.

4. A process for separating niobium and tantalum values from one another comprising contacting under anhydrous conditions in an inert atmosphere phosphorus oxychloride with a mixture containing anhydrous niobium pentachloride, anhydrous titanium pentachloride and anhydrous aluminum chloride; fractionally distilling under anhydrous conditions and in an inert atmosphere the resulting mixture containing the 1:1 addition product of phosphorus oxychloride with niobium pentachloride and the 1:1 addition product of phosphorus oxychloride with tantalum pentachloride; and separately recovering the niobium and tantalum values.

5. A process for separating niobium and tantalum values from one another which comprises adding anhydrous aluminum chloride to a mixture containing anhydrous niobium pentachloride and tantalum pentachloride, reacting the resulting mixture under anhydrous conditions and in an inert atmosphere with at least one molecule of phosphorus oxychloride for each molecule of the aluminum, niobium and tantalum chlorides present in said resulting mixture, whereby the 1:1 addition product of phosphorus oxychloride with niobium pentachloride and the 1:1 addition product of phosphorus oxychloride with tantalum pentachloride are formed; distilling under anhydrous conditions and in an inert atmosphere the mixture containing the formed addition products; and separately condensing niobium and tantalum values.

6. The process according to claim 5 wherein the distillation is carried out under reduced pressure.

7. A process for separating niobium and tantalum values from one another comprising fractionally distilling under anhydrous conditions and in an inert atmosphere a mixture of the 1:1 addition products of phosphorus oxychloride with niobium pentachloride and of phosphorus oxychloride with tantalum pentachloride, separately recovering the fraction of niobium addition product and the fraction of tantalum addition product, separately decomposing the separated addition products into phosphorus oxychloride and the respective pentachloride by treatment with inert solvents, and recovering the resulting niobium values and the resulting tantalum values.

8. A process for separating niobium and tantalum values from one another comprising contacting in an inert atmosphere under anhydrous conditions phosphorus oxychloride with a mixture containing anhydrous niobium pentachloride and anhydrous titanium pentachloride; fractionally distilling in an inert atmosphere under anhydrous conditions the resulting mixture containing the 1:1 addition product of phosphorus oxychloride with niobium pentachloride and the 1:1 addition product of phosphorus oxychloride with tantalum pentachloride; and separately recovering the niobium and tantalum values.

References Cited in the file of this patent

Hopkins: "Chemistry of the Rarer Elements," D. C. Heath and Co., New York, 1923, page 227.

UNITED STATES PATENT OFFICE
CERTIFICATE OF CORRECTION

Patent No. 2,936,214                              May 10, 1960

Walter Scheller et al.

It is hereby certified that error appears in the printed specification of the above numbered patent requiring correction and that the said Letters Patent should read as corrected below.

Column 3, line 7, for "exceses" read -- excess --; column 5, line 18, for "in freed" read -- is freed --; column 6, lines 38 to 42, should appear as shown below instead of as in the patent:

```
Height of column -------- 1600 mm. (Pyrex glass).
Diameter of column -----   26 mm.
Filling bodies ---------    4 mm. Berl saddles.
Pressure ---------------  100 mm. Hg (carbon dioxide).
Dynamic pressure -------  150 mm. Hg.
```

Signed and sealed this 11th day of October 1960.

(SEAL)
Attest:

KARL H. AXLINE                              ROBERT C. WATSON
Attesting Officer                           Commissioner of Patents